May 25, 1965  D. HALEY  3,185,753
METHOD FOR THE PRODUCTION OF SHAPED PRODUCTS
Filed July 25, 1962  4 Sheets-Sheet 1

INVENTOR
DENIS HALEY

By Cushman, Darby & Cushman
ATTORNEYS

May 25, 1965 D. HALEY 3,185,753
METHOD FOR THE PRODUCTION OF SHAPED PRODUCTS
Filed July 25, 1962 4 Sheets-Sheet 2

INVENTOR
DENIS HALEY
BY
Cushman, Darby & Cushman
ATTORNEYS

United States Patent Office 3,185,753
Patented May 25, 1965

3,185,753
METHOD FOR THE PRODUCTION OF
SHAPED PRODUCTS
Denis Haley, Abberley, England, assignor to Imperial
Chemical Industries Limited, London, England, a corporation of Great Britain
Filed July 25, 1962, Ser. No. 212,295
Claims priority, application Great Britain, July 28, 1961,
27,437/61
5 Claims. (Cl. 264—331)

The present invention relates to improvements in or relating to a method for the production of shaped products and is particularly concerned with a method for the production of shaped products by compression moulding of plastics material. The term "plastics material" includes theromsetting plastics material and thermoplastic plastics material.

Compression moulding of thermosetting plastics material has usually required the following principal mould components:

(a) A mould cavity corresponding in shape to the external surface of the final component.

(b) An external cavity, which is usually an extension of the mould cavity, to hold the bulk of the moulding compound. The size of this external cavity is in the main controlled by the bulk factor of the moulding material, which may range from 2:1 to 15:1, and by the shape of the final product.

(c) A punch which enters the external cavity and compresses the moulding material causing it to flow into the moulding cavity and continue to flow until the required moulding pressure is obtained.

A disadvantage of compression moulding which requires the use of the aforementioned mould components is that a considerable pressure gradient is set up through the moulding material which, particularly for thin-walled mouldings or in areas remote from the pressurizing surface, may result in lack of consolidation and even faluire to fill the cavity of the mould. For instance, by such compression moulding it has been usually particularly difficult to mould long thin-walled tubular sections using pressures applied along the longitudinal axis. It has been possible to produce tubes moulded by pressure applied perpendicular to this axis but high compression loads are required, length is limited and consolidation of the moulding material is not uniform.

According to the present invention the method for the production of shaped products by compression moulding of plastics material comprises compressing and heating the plastics material in particulate form to bring it to a flowable state under a pressure at least equal to its recommended moulding pressure and retaining the thus compressed material at a temperature at least equal to its flow temperature while under said pressure, shaping the resulting flowable material at said temperature while maintaining throughout the material a pressure at least equal to said moulding pressure, and thereafter solidifying the shaped product thus formed, preferably under a recommended moulding pressure.

For thermosetting plastics material the solidifying of the aforesaid shaped product is effected by curing and for thermoplastic plastics material the solidifying is carried out by cooling.

Preferably the said plastics material in particulate form is first brought to and retained at said pressure at least equal to its recommended moulding pressure and the thus compressed plastics material is then heated to said temperature at least equal to its flow temperature while under said pressure.

The plastics material in particulate form can be, for example, in the form of flock or powder.

In the present context the expression "recommended moulding pressure" means the moulding pressure or pressures recommended by the manufacturer of the particular plastics material in use.

In carrying out the method of the present invention the plastics material in particulate form is compressed to the recommended moulding pressure before it is formed to the shape of the final product. During the shaping or flow of the material there is no reduction in the initial applied pressure. The shaping or flow is produced by the application of further pressure. The carrying out of the method of the present invention need not involve however any change of volume after the initial pressure, i.e. a pressure at least equal to the moulding pressure of the plastics material, has been applied.

The method of the present invention allows tubular and deep hollow shapes to be moulded having high and uniform moulding pressures applied to all areas of the moulded product. Examples of shaped products which can be made according to the invention are flanged pipes for use in chemical plant where hot corrosive liquids are handled, deep moulded components such as washing machine tubs of urea or melamine formaldehyde, and blast tube and motor case linings for solid fuel rocket motors.

The invention will be further understood from the following detailed description in conjunction with the drawings in which.

Figure 1:
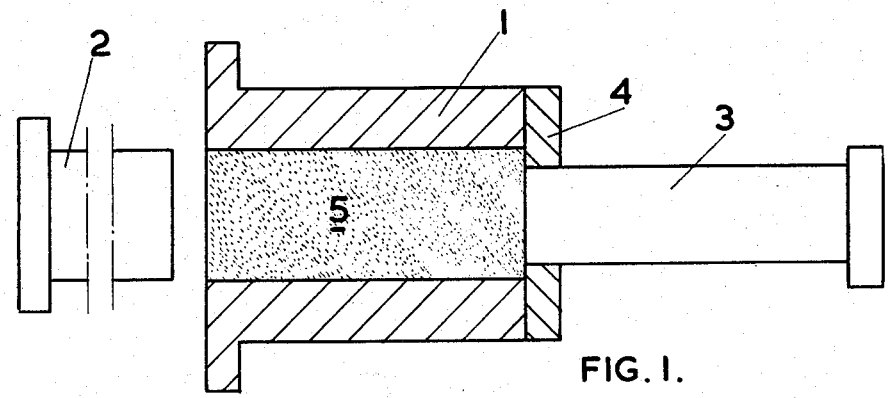
FIGURE 1 is a sectional elevation of a mould having a calculated quantity of flock in its cavity.
Figure 2:
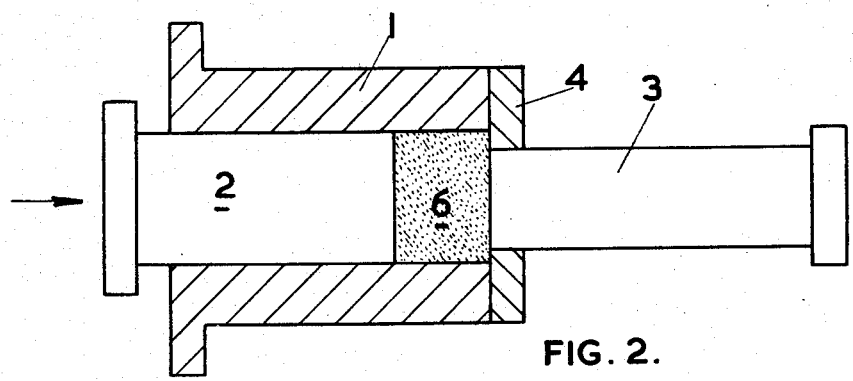
FIGURE 2 is a sectional elevation of the same mould with the calculated quantity of flock compressed in the cavity.

The production from "Dureston" (a registered trademark for a thermosetting resin impregnated asbestos) flock of a cylindrical tube, internal diameter 3.5 inches, outside diameter 4.25 inches, length 9 inches will now be described by way of example and with reference to FIGURES 1–4. In these figures 1 is a thick-walled hollow cylinder, bore 4.25 inches and length 10 inches. This cylinder 1 is normally surrounded by a heating coil (not shown). T is a piston which is a sliding fit in the bore of cylinder 1 and can be moved into the cylinder 1 by a hydraulic ram (not shown) capable of imposing a sustained load of 30 tons on piston 2. This load is indicated by arrows in FIGURES 2–4. 3 is a cylindrical core actuated by a hydraulic ram (not shown), capable of imposing a 60 ton load on cylindrical core 3. This load is indicated by arrows in FIGURE 3. The cylindrical core 3 can be withdrawn from the bore of cylinder 1 completely when required. 4 is a steel ring bolted concentrically to cylinder 1 and has an internal diameter to permit a sliding fit on cylindrical core 3.

It is known that "Durestos" flock has a bulk factor of

15:1 and so there must be a reduction in volume of 15:1 between this flock as received and the final volume of the compressed material when under a pressure at least equal to its moulding pressure. It is also known that as the specific gravity of moulded "Durestos" flock is 1.75 the volume of the moulding can be calculated as 41.08 cubic inches. The weight of the moulded tube will therefore be 41.6 oz.

Figure 3:
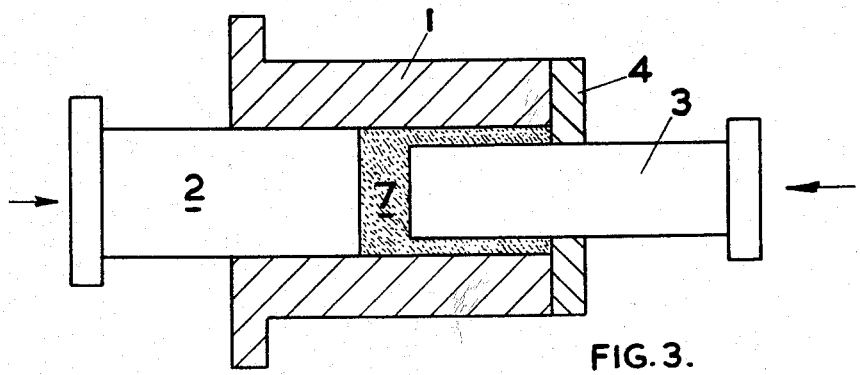
FIGURE 3 is a sectional elevation of the same mould in which a tube is half-formed from the compressed calculated quantity of flock.
Figure 4:
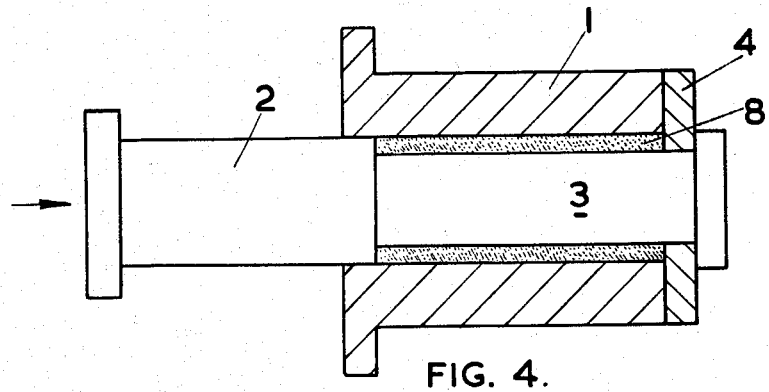
FIGURE 4 is a sectional elevation of the same mould in which a tube is completely formed from the compressed calculated quantity of flock.

To produce the aforesaid cylindrical tube 42 oz. of "Durestos" flock 5 is introduced into the bore of cylinder 1 when the mould is set up as in FIGURE 1, the extra 0.4 oz. being allowed for loss due to flash and so on. The piston 2 is then introduced into the bore of cylinder 1 as in FIGURE 2 and the flock 5 is compressed under 30 tons load to approximately 2 tons/sq. in., which is the recommended moulding pressure, to form a compressed flock 6. Core 3 is at this stage external to the bore of cylinder 1 and is retained with its inner face flush with the inner face of steel ring 4. At this stage the compressed flock 6 is heated to the "flow" temperature of approximately 90° C. Core 3 is now moved into the bore of cylinder 1 as in FIGURE 3. The load available from its associated hydraulic ram (not shown) is 60 tons, but the load required depends on the flow characteristics of the "Durestos" and the distance this core 3 projects into the bore of the cylinder 1. As core 3 enters the bore of cylinder 1, exerting a pressure in excess of 2 tons/sq. in. on the "Durestos," which being at "flow" temperature behaves as a viscous liquid, piston 2 moves back to maintain a constant volume within the bore of cylinder 1. The positions of piston 2 and core 3 in FIGURE 3 are such that the "Durestos" has been shaped into a half-formed tube 7.

If the hydraulic rams (not shown) operating piston 2 and core 3 are on a common line pressure, the movement of piston 2 will automatically be controlled by a flow of fluid from the hydraulic ram cylinder associated with piston 2 to hydraulic ram cylinder associated with core 3.

Core 3 is permitted to move inward and piston 2 outward until core 3 protrudes 9 inches into the bore of cylinder 1. The "Durestos" is now completely in the form of a cylinder 8. At this stage, as in FIGURE 4, core 3 will contact piston 2. The temperature of the "Durestos" is then raised to its curing temperature (145° C.) for the required period of time. When the moulding thus produced is fully cured the core is withdrawn and the moulding, in the form of a cylindrical tube, is removed from the cylinder 1.

When all the "Durestos" has been displaced to the annulus around cylindrical core 3 at a minimum of 2 tons/sq. in. no further pressure can be applied and the position is the same as when a horizontal flash type of mould tool has closed.

Figure 5:
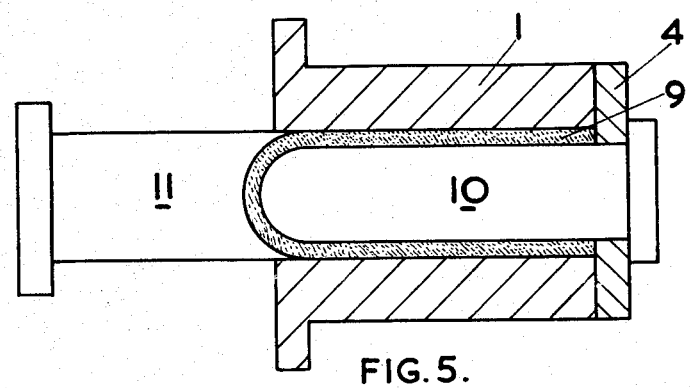
FIGURE 5 is a sectional elevation of another mould showing the production of a tube having a closed end.

If the movement of core 3 is stopped at a point short of piston 2 and the load on piston 2 is maintained, a positive pressure will be maintained on the "Durestos" during the curing cycle. This arrangement would form a closed ended tube. A closed ended tube 9 can also be formed in the device illustrated in FIGURE 5 wherein core 10 is convex ended and has a maximum length longer than 10 inches and piston 11 is concave ended.

Figure 6:
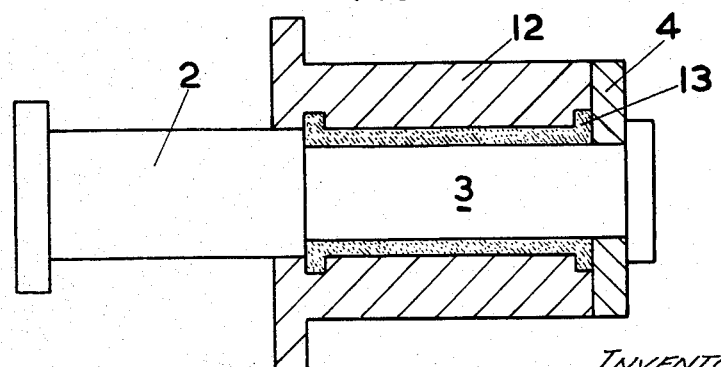
FIGURE 6 is a sectional elevation of another mould showing the production of a tube having flanged ends.

If in a moulding device for the carrying out of the invention the cylinder is adapted to be split longitudinally, moulded tubes of a wide range of external profiles can be formed therein and then extracted therefrom. For example in the moulding device illustrated in FIGURE 6 cylinder 12 is adapted to be split longitudinally. Flanged tubes 13 can be produced in this cylinder 13 and after curing removed therefrom.

It is also possible to carry out the method of the invention using normal compression moulding on a single ram press. This procedure will now be described by way of example with reference to FIGURES 7 and 8 wherein a moulding arrangement is mounted vertically between platens 14 and 15.

Figure 7:
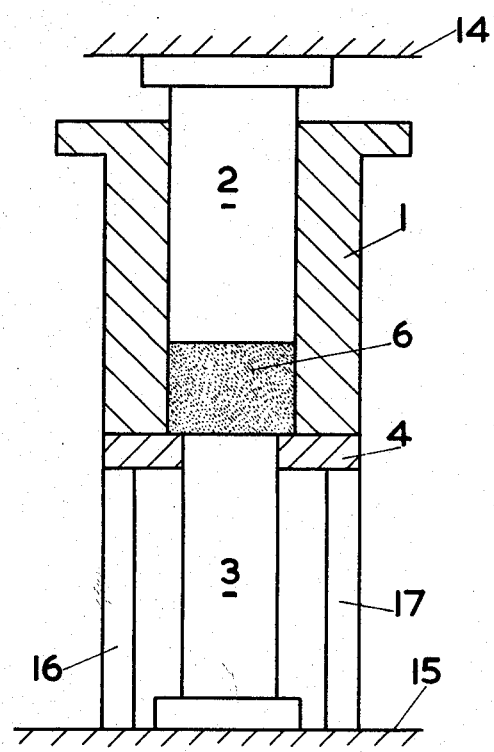
FIGURE 7 is a sectional elevation of a modified moulding arrangement.

In FIGURE 7 spacers 16, 17 are positioned between steel ring 4 and the face of the bottom platen 15 to maintain the face of cylindrical core 3 flush with the inner surface of steel ring 4. The calculated weight of flock is introduced into cylinder 1. This flock is compressed to compressed flock 6 under a load of 2 tons/sq. in. approximately by piston 2 which reaches the position illustrated in FIGURE 7. The flock is then heated to "flow" temperature and the load eased to allow the spacers 16, 17 to be removed. After removal of the spacers 16, 17 the load is re-applied.

The pressure set up in the flock which now behaves as a liquid is transmitted to the exposed face of ring 4, causing cylinder 1 to move downwards over core 3. The power stroke of the press is at the same time moving piston 2 to core 3 and they will contact when core 3 projects 9 inches into the cylinder 1. The temperature of the moulding is then increased for the cure cycle.

Figure 8:
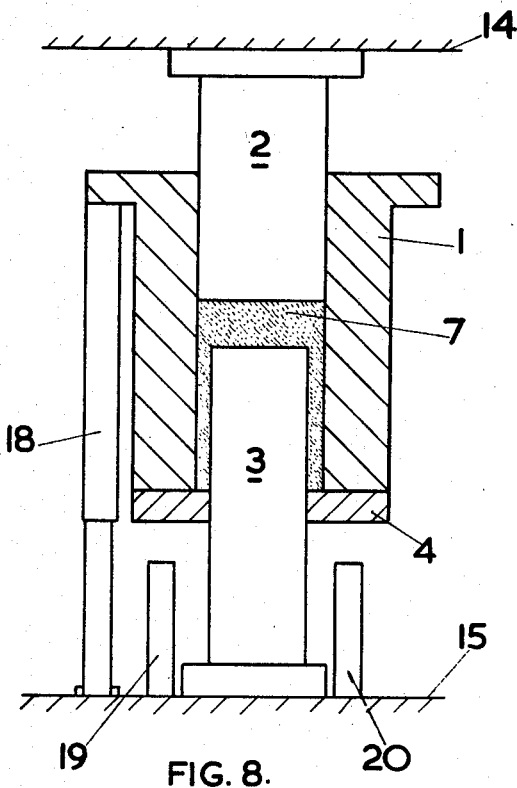
FIGURE 8 is a sectional elevation of the arrangement of FIGURE 7 at a later stage in the moulding process.

The main objection to this arrangement is that with a free-flowing moulding material, if the movement of the cylinder 1 is not restricted, there will be an uncontrolled drop of pressure when cylinder 1 moves downward. It is therefore desirable to restrict this movement by incorporating a hydraulic damper 18 as indicated in FIGURE 8.

Better consolidation can be obtained by producing a closed ended tube 7. This will be obtained if stops 19, 20 are positioned to limit the movement of cylinder 1 relative to core 3.

In this single ram arrangement it is possible to mould a 9 inch long tube with a power stroke of approximately 3 inches. The ratio of the length of the tube to the length of the power stroke is equal to the ratio of the areas of the cross-section of the cavity of cylinder 1 and the tube wall of the moulding.

I claim:

1. A method for the production of a solid tubular article by compression moulding of plastics material comprising: compressing a particulate plastics material in a mould having a tubular cavity fitted with a piston, said mould cavity having a transverse dimension equal to the outside transverse dimension of the tubular article to be moulded, said compressing being effected by relative telescopic movement between said piston and said mould; heating the compressed plastics material to a temperature at which it is flowable under the pressure within said mould cavity; moving a solid core having a transverse dimension equal to the inner transverse dimension of the tubular article to be produced into the mould cavity from the end thereof opposite to said piston and in a direction opposite to the direction of said piston during said compressing step whereby an annular space is formed between said core and said mould, said movement being effected by relative telescopic movement between said mould and said core; simultaneously effecting relative telescopic movement between said mould and said piston in a direction opposite to their movement during said compressing step and at a rate to maintain the plastics material under substantially the pressure exerted during said compressing step whereby the compressed plastics material is forced into said annular space between said core and said mould; and solidifying the plastics material while maintaining said pressure to thereby form said solid tubular article.

2. A method as in claim 1 wherein said plastics material is a thermosetting material and wherein said solidifying step is effected by curing said material.

3. A method as in claim 1 wherein said plastics material is a thermoplastic material and wherein said solidifying step is effected by cooling said material.

4. A method as in claim 1 wherein said mould is held stationary throughout the process and wherein said piston and core are moved relative to said mould.

5. A method as in claim 1 wherein said core is held stationary throughout the process and wherein said mould is moved relative to said core to form said annular space.

References Cited by the Examiner

UNITED STATES PATENTS

| | | | |
|---|---|---|---|
| 2,397,626 | 4/46 | Shriver | 264—323 |
| 2,561,735 | 7/51 | Haller | 18—16.5 |
| 2,562,876 | 8/51 | Baëza | 18—16.5 |
| 2,617,152 | 11/52 | Rubin | 18—55 |
| 2,675,581 | 4/54 | Payne | 18—16.5 |
| 2,770,842 | 11/56 | Hahn et al. | 18—55 |
| 2,791,806 | 5/57 | Tordella | 18—55 |

ALEXANDER H. BRODMERKEL, *Primary Examiner.*